United States Patent
Zeng

(10) Patent No.: US 7,962,810 B2
(45) Date of Patent: Jun. 14, 2011

(54) RECORDING MEDIUM STRUCTURE CAPABLE OF DISPLAYING DEFECT RATE

(75) Inventor: Wen-Jun Zeng, Keelung (TW)

(73) Assignee: Industrial Technology Research Institute, Hsinchu (TW)

( * ) Notice: Subject to any disclaimer, the term of this patent is extended or adjusted under 35 U.S.C. 154(b) by 729 days.

(21) Appl. No.: 12/024,118

(22) Filed: Feb. 1, 2008

(65) Prior Publication Data

US 2009/0141602 A1    Jun. 4, 2009

(30) Foreign Application Priority Data

Nov. 29, 2007   (TW) ................................ 96145410 A

(51) Int. Cl.
*G11C 29/00*   (2006.01)
(52) U.S. Cl. ..................................................... 714/723
(58) Field of Classification Search .................. 714/718, 714/723

See application file for complete search history.

(56) References Cited

U.S. PATENT DOCUMENTS

| 6,058,047 A * | 5/2000 | Kikuchi .................... 365/185.33 |
| 6,081,878 A | 6/2000 | Estakhri et al. |
| 7,137,027 B2 * | 11/2006 | Shiota et al. ...................... 714/5 |
| 7,277,011 B2 * | 10/2007 | Estakhri ........................ 340/540 |
| 7,299,316 B2 * | 11/2007 | Chou et al. .................... 711/103 |
| 7,318,117 B2 * | 1/2008 | Lee et al. ....................... 711/103 |
| 7,567,461 B2 * | 7/2009 | Roohparvar ............. 365/185.19 |
| 7,664,987 B2 * | 2/2010 | Bychkov et al. ................. 714/30 |
| 2005/0204187 A1 * | 9/2005 | Lee et al. ............................ 714/8 |
| 2009/0199056 A1 * | 8/2009 | Murata ........................ 714/704 |

* cited by examiner

*Primary Examiner* — James C Kerveros
(74) *Attorney, Agent, or Firm* — Jianq Chyun IP Office

(57) ABSTRACT

A recording medium structure capable of displaying a defect rate is provided. The recording medium has at least one use area with endurance blocks, and each endurance block has an endurance value. The recording medium structure has a housing, a first and a second off-line display units arranged on the housing for respectively displaying a real defect rate and a potential defect rate of the recording medium. The real defect rate is calculated based on an error correction coed, and the potential defect rate is calculated based on an endurance values recorded in the endurance table.

23 Claims, 9 Drawing Sheets

| TIMES | ECC | Endu |
|---|---|---|
| 0-9999 | 0 | 0 |
| 0-19999 | 0-2 | 1 |
| 0-49999 | 0-4 | 2 |
| 0-Max | NO DEFECT | 3 |

RECORDING MEDIUM STRUCTURE CAPABLE OF DISPLAYING DEFECT RATE

CROSS-REFERENCE TO RELATED APPLICATION

This application claims the priority benefit of Taiwan application serial no. 96145410, filed on Nov. 29, 2007. The entirety of the above-mentioned patent application is hereby incorporated by reference herein and made a part of this specification.

BACKGROUND OF THE INVENTION

1. Field of the Invention

The present invention generally relates to recording medium structure, in particular, to a memory structure capable of displaying a defect rate thereof.

2. Description of Related Art

The data recording function of a storage medium, especially a non-volatile memory such as a flash memory, starts to deteriorate after the storage medium has been written and erased for above predetermined times due to the tunnelling effect of semiconductors. To resolve foregoing problem, error correction codes (ECCs) are used in data blocks of a memory for data corrections. Additionally, defect management, software management, or endurance management has also been adopted for managing or correcting defective data in a memory. However, each of these methods has its disadvantage.

According to the ECC method, another management mechanism has to be adopted when the error can not be corrected. Thus, a potential defect data block cannot be effectively predicted and accordingly the defect cannot be prevented in advance. According to the defect management method, the defect is not predicted or prevented in advance; instead, a defective block is just marked and managed. However, in the defect management method, data may be damaged in a new defective block.

According to the software management method, a flash memory for management is embedded in an operating system or application software. However, the storage medium of such method cannot be portable, and when the operating system or application software is re-installed, the management data will be lost. In addition, an endurance management is to manage the memory usage based on a counting manner.

In addition, the endurance management is a counting management method. This method utilizes writing times as a mechanism for damage prevention. This method will waste many data blocks that are marked as defective blocks before any defect occurs therein. In addition, the endurance management is not applicable to data blocks whose damage is caused by non-writing operations, for example, the data block is read many times or left idle for very long time.

Accordingly, a method for effectively managing defective data blocks and preventing defects in advance is required. Further, it is also demanded of how to show the management result of the defect storage blocks to the users, and thereby improving the defect management efficiency.

SUMMARY OF THE INVENTION

Accordingly, the present invention is to provide a method for effectively preventing defects and managing different defective data blocks. Important data can be protected before data is damaged and a defect caused by erasing/writing or reading a data block too many times or leaving the data block idle for a long time can be prevented. In this manner, data blocks starting having damages can be effectively used and managed. In addition, through the above method, the invention can provide the result to a user on display units to increase damage management efficiency.

The present invention provides a recording medium structure capable of displaying a defect rate. The recording medium comprises at least one use data area having a plurality of endurance blocks, and each of the endurance blocks has an endurance value. The recording medium structure comprises a housing, a first off-line display unit and a second off-line display unit. The first off-line display unit is arranged on the housing for displaying a real defect rate of the recording medium, in which the real defect rate is calculated according to an error correction code (ECC). The second off-line display unit is arranged on the housing for displaying a potential defect rate of the recording medium, in which the potential defect rate is calculated according to the endurance values.

The present invention further provides a recording medium structure capable of displaying a defect rate. The recording medium comprising at least one use data area having a plurality of endurance blocks, and each of the endurance blocks has an endurance value. The recording medium structure comprises a housing, a plurality of replaceable memory blocks, a plurality of first off-line display unit and a plurality of first off-line display unit. The replaceable memory blocks are arranged in the housing. The first off-line display unit are used for displaying a real defect rate of the replaceable memory blocks, in which the real defect rate is calculated according to an error correction code (ECC). The second off-line display unit is used for displaying a potential defect rate of the recording medium, in which the potential defect rate is calculated according to the endurance values.

The invention further provides a recording medium structure capable of displaying a defect rate. The recording medium structure comprises a storage area, a space manager, an ECC unit, an endurance table, a first off-line display unit, a second off-line display unit and a microcontroller. The storage area comprises at least one plurality of endurance blocks. The space manager is coupled to the storage area for managing the storage area. The ECC unit is coupled to the storage area and the space manager, and the ECC unit performs an ECC detection and correction when an erase/write operation or a read operation is performed to the storage area. The endurance table is used to record an endurance value of each of the endurance blocks. The first off-line display unit is used for displaying a real defect rate of the recording medium, in which the real defect rate is calculated according to an error correction code (ECC). The second off-line display unit is used for displaying a potential defect rate of the recording medium, in which the potential defect rate is calculated according to the endurance values. The microcontroller, coupled to the space manager, the first off-line display unit and the second off-line display unit, for controlling the first and the second off-line display units according to a processed result of the ECC unit and the endurance values recorded in the endurance table.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
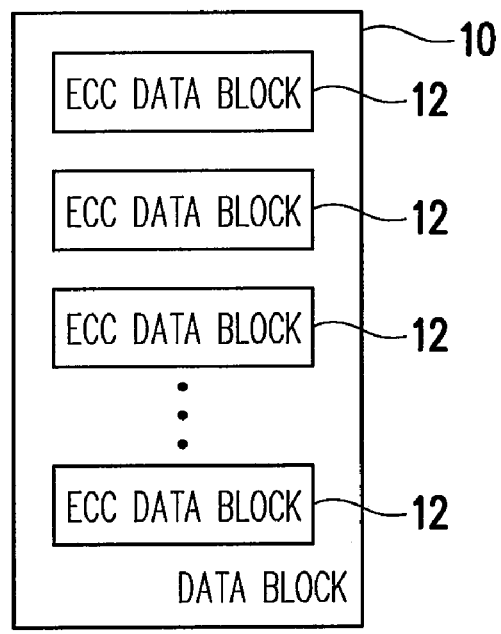
FIG. 1 is a diagram of a data block having a plurality of ECC units.

Reference will now be made in detail to the present preferred embodiments of the invention, examples of which are illustrated in the accompanying drawings. Wherever possible, the same reference numbers are used in the drawings and the description to refer to the same or like parts.

Before describing the defect management method and system thereof for a storage medium provided by the present invention, the data structure of the storage medium will be explained herein. Only related information of the data structure is described herein; however, the complete data structure may further include other information in actual applications.

FIG. 1 is a schematic a diagram showing a data block having a plurality of ECC units. A flash memory will be described as an example in following embodiments. The data block 10 illustrated in FIG. 1 is a basic read/write unit in the flash memory. The data block 10 comprises one or plural ECC data blocks 12. The size of the data block 10 can be 512 B or 2 KB, and this size can also be adjusted appropriately according to the actual design requirement. Each ECC data block 12 contains data indicating error-correctible bit number, for example, 16 bits. An error correction process can be performed by using the ECC data blocks 12 to data to be read from or written into the flash memory.

Each ECC data block 12 has its own detectible error bit number and correctible error bit number. In addition, each data block 10 also has its own detectible error bit number and correctible error bit number. Namely, in the data block 10, the total number of detectible error bits is a sum of detectible error bit numbers of all ECC data blocks, and the total number of correctible error bits is a sum of correctible error bit numbers of all ECC data blocks 12.

Figure 2:
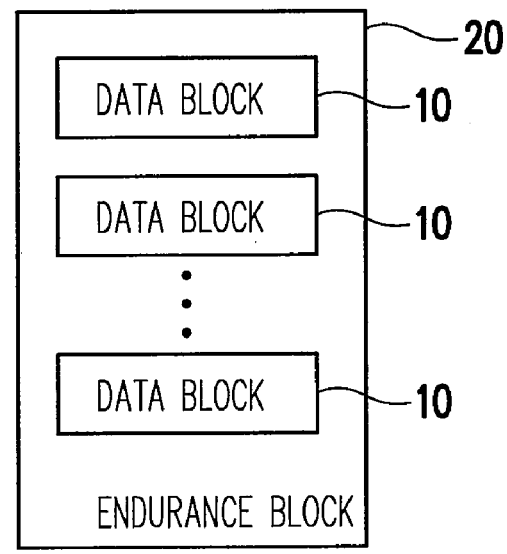
FIG. 2 is a diagram of an endurance block according to one embodiment of the present invention.

FIG. 2 is a schematic diagram of an endurance block according to one embodiment of the present invention. Referring to FIG. 2, in the present embodiment, the endurance block 20 in the flash memory can comprise a plurality of data blocks 10 illustrated in FIG. 1. The endurance block is used as a basic unit for recording and calculating a damage degree in the flash memory.

According to the embodiment, the data/files stored in the flash memory are categorized according to their importance, and a specific endurance value Endu is given to each endurance block 20; namely, a reference tag is attached to each storage area in the flash memory to present a damage degree, so that the system can predict the endurance of the storage area. For example, a storage area can be given an endurance value 0, 1, 2, or 3 according to a degree of data to be error. The smaller the Endu value is, the more reliable the storage area is and accordingly the more suitable the storage area is for storing data/files with higher importance. In this manner, the reliabilities of storage areas in the flash memory can be predicted in advance, so that the data/files with higher importance can be stored in a storage area having higher reliability. The method for categorizing data/files according to their importance will be described in detail as follows.

The above categorization can be carried out by the system according to the attributes or file extensions of the data/files, or the categorization may also be carried out by a user. After categorizing the data/files according to their importance, the endurance blocks having different endurance values Endu can be corresponded to data/files importance of different levels according to their importance.

If the categorization is carried out by the system, the data/files related to system operations, for example, system files and hidden files, can be stored in an area having Endu=0, the data files can be stored in an area having Endu=1, the video/audio files can be stored in an area having Endu=2, and backup files are stored in an area having Endu=1.

If the categorization is carried out by a user, important data or video/audio files can be stored in an area having Endu=0, general data or video/audio files can be stored in an area having Endu=1, and data or video/audio files of lower importance can be stored in an area having Endu=3. However, the correspondence between data/files of different level importance and endurance blocks having different endurance values Endu is not particularly limited, and can be determined according to the categorization method adopted by the system or the user.

Figures 3, 4:
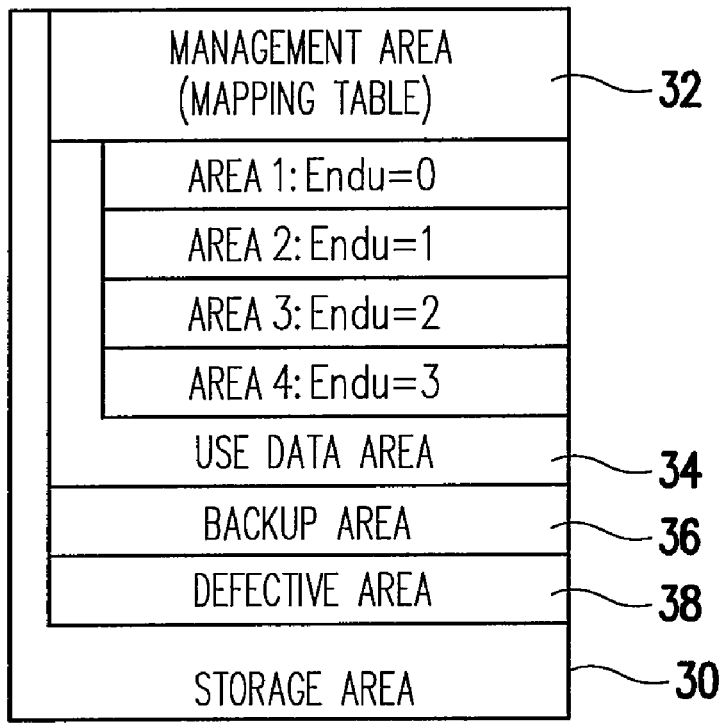
FIG. 3 is a diagram of a storage area in a memory according to one embodiment of the present invention.
FIG. 4 is a diagram of an endurance table in a management area according to one embodiment of the present invention.

FIG. 3 is a diagram of a storage area in a memory according to one embodiment of the present invention. As shown in FIG. 3, n an example of the allocation of a logic storage area in the memory is illustrated. For example, the storage area 30 is divided into a management area (mapping table) 32, a use data area 34, a backup area 36 and a defective area 38. In the present embodiment, the use data area 34 can be further divided into areas 1~4 according to the endurance values Endu, so that data/files can be stored in different areas according to their importance.

A record table, i.e., endurance table, is stored in the management area 32. The endurance table records the locations of endurance blocks, writing cycles of the endurance blocks, ECC error correction bit numbers and endurance values Endu (indicating ). FIG. 4 is a schematic diagram of an endurance table in the management area according to one embodiment of the present invention. Referring to FIG. 4, the endurance value Endu can be a function or a determination formula of a counting number and an ECC. Generally, a flash memory has an E/W reference value (i.e., an erase/write reference value, which refers to how many erasing/writing cycles can be performed to the flash memory) and a distribution (i.e., defect may occur after how many writing cycles) when it is just manufactured. A corresponding function or determination formula can be defined with the E/W reference value, the ECC error correction, and the distribution, so as to calculate the endurance value Endu with the counting number and ECC. The function or determination formula can be revised according to the current memory status and defective status of the flash memory along with the increase of erasing/writing cycles.

A storage area can be divided into a plurality of areas (i.e., the endurance blocks) according to different endurance values Endu in foregoing endurance table. As shown in FIG. 3, the storage area is divided into areas 1~4 according to the endurance values Endu 0~3.

In addition, the function or determination formula corresponding to the endurance values Endu can also be adjusted according to the amount of files of different levels. Moreover, the management area 32 can be implemented with a storage medium of higher reliability, for example, a MRAM, because of the importance of the management area 32.

As described above, it is clear that an ECC error rate and the Endu values of the endurance blocks of the recording medium are recorded in the endurance table. The ECC error rate represents a real error rate of the endurance block, while the Endu value represents a potential error rate of the endurance block. The ECC error rate and the Endu value can be converted into percentages which respectively represent the real error rate and the potential error rate of the endurance block. The user of the recording medium can easily know the defect or damage condition of the recording medium through the two percentage parameters, preventing the loss of important data in advance.

Figure 5A:
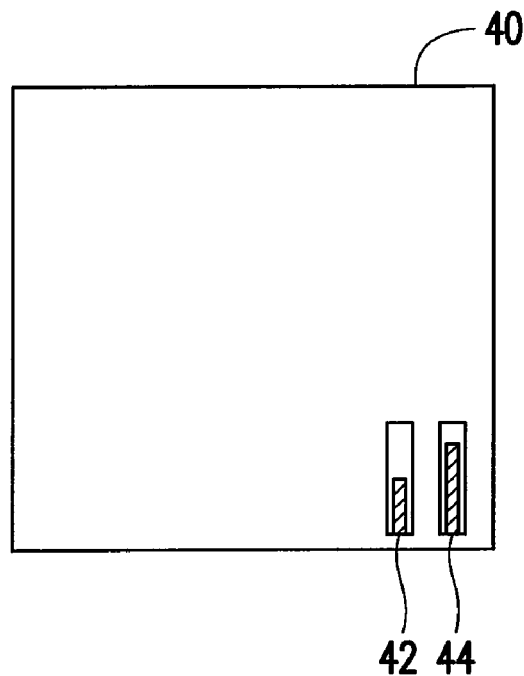
FIGS. 5A and 5B illustrate a recording medium structure possessing a portable recording medium damage prevention management and a method for displaying the same according to one embodiment of the present invention.
Figure 5B:
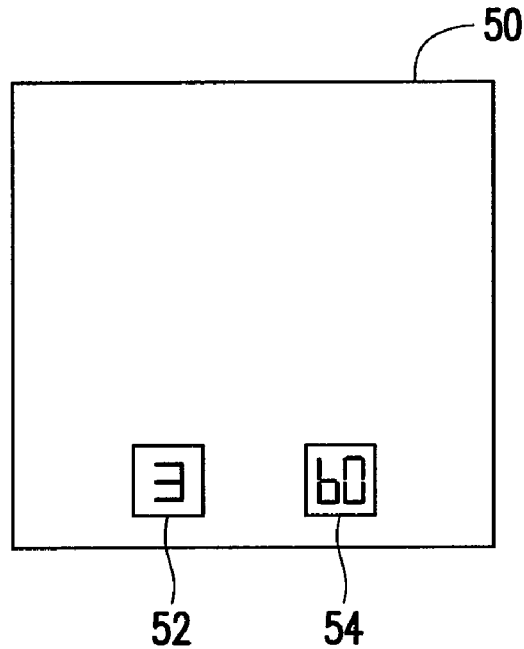

FIGS. 5A and 5B illustrate a recording medium structure for a portable recording medium damage prevention management and a method for displaying the same according to one embodiment of the present invention. Referring to FIG. 5A, a portable recording medium comprises a housing 40. The portable recording medium further comprises two off-line display units 42 and 44. The two off-line display units 42 and 44 are defined by the present invention hereby as capable of displaying information when detached from a host or without power supply.

As shown in FIG. 5A, the off-line display unit 42 and 44 can display information with strip shapes. For example, the off-line display unit 42 displays the ECC error rate, i.e., the real defect rate, while the off-line display unit 44 displays the Endu value, i.e., the potential defect rate. The lengths of the strips are respectively corresponding to the percentage rates as described above. In such a way, the defect condition of the recording medium can be easily obtained according to the lengths of the strips.

In addition, different colors can also be used to distinguish defect condition of the recording medium. For example, green is used to represent a lower defect rate, while red is used to represent a higher defect rage, and colors therebetween, such as orange color, are represent defect rates between the lower defect rate and the higher defect rate. By displaying color, the current defect condition of the recording medium can be obtained. FIG. 5B is basically similar to FIG. 5A, off-line display units 52 and 54 on the housing 50 display with numerals. Therefore, any possible display form can be adopted for the off-line display units only that the ECC error rate (real defect rate) and Endu value (potential defect rate) can be clearly and sufficiently represented.

Figure 6:
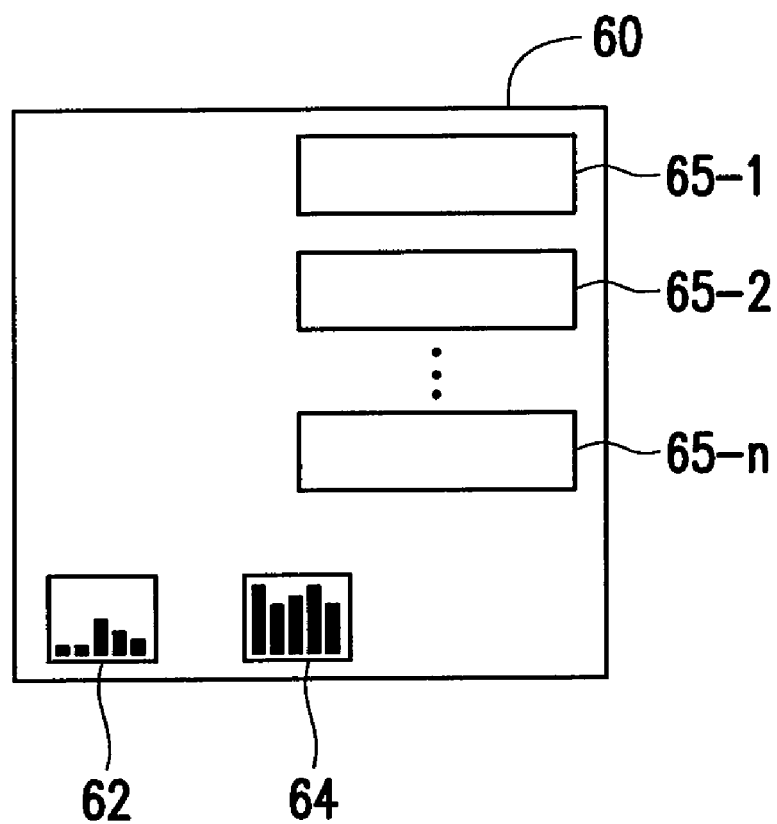
FIG. 6 illustrates a recording medium structure possessing a portable recording medium damage prevention management and a method for displaying the same according to another embodiment of the present invention.

FIG. 6 illustrates a recording medium structure that possesses a portable recording medium damage prevention management and a method for displaying the same according to another embodiment of the present invention. The embodiment illustrated in FIG. 6 is a case for a number of replaceable recording media. Referring to FIG. 6, a housing 60 is shown, and the recording medium structure further accommodates a number of replaceable recording blocks $65\_1$, $65\_2$, ..., $65\_n$. In addition, two off-line display units 62, 64 are further arranged on the housing 60. The off-line display unit 62 is adapted for displaying the ECC error rate, i.e., the real defect rate, while the off-line display unit 64 is adapted for displaying the Endu value, i.e., the potential defect rate. In FIG. 6, real defect rates of all replaceable storage blocks $65\_1$, $65\_2$, ..., $65\_n$ are displayed on the off-line display unit 62, while potential defect rates of all replaceable storage blocks $65\_1$, $65\_2$, ..., $65\_n$ are displayed on the off-line display unit 64. Of course, the off-line display units 62, 64 can alternatively be disposed on each of the replaceable storage blocks $65\_1$, $65\_2$, ..., $65\_n$, like illustrations shown in FIGS. 5A and 5B.

In. FIG. 6, the recording medium for example can be a system including a number of flash memories, or a hard disc array having a number of hard discs. In this way, the user is allowed to know individual defect condition of each of the replaceable storage blocks $65\_1$, $65\_2$, ..., $65\_n$ of the recording medium structure. Due to the display of the defect rates, the user can replace those storage blocks with higher defect rates according to his budget or habit, etc.

Further, if a writing strategy is incorporated when writing data, portions having no error yet in those endurance blocks with a higher error rate are more often used, and defects can be intentionally concentrated to one storage block, so as to allow the user to replace the storage blocks with an efficient way.

Figure 7A:
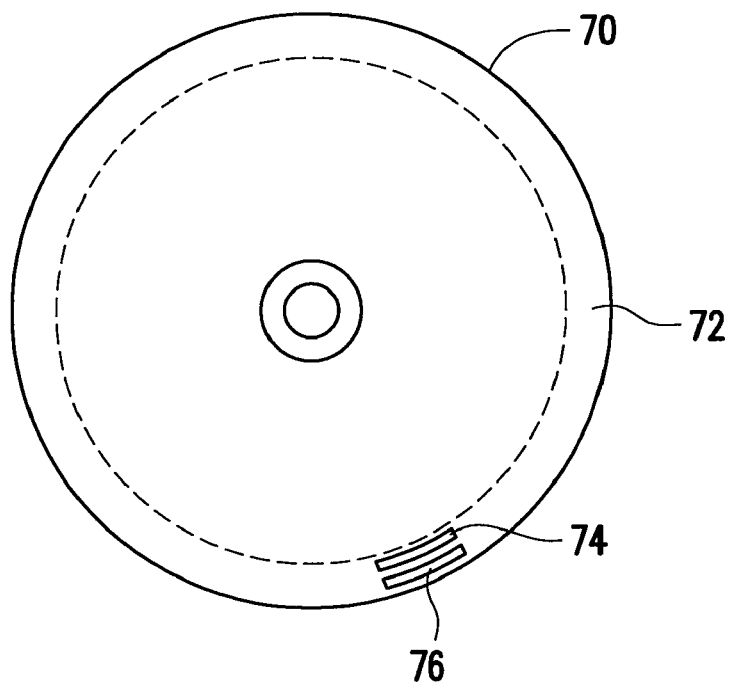
FIGS. 7A and 7B illustrate a recording medium structure possessing a portable recording medium damage prevention management and a method for displaying the same according to another embodiment of the present invention.
Figure 7B:
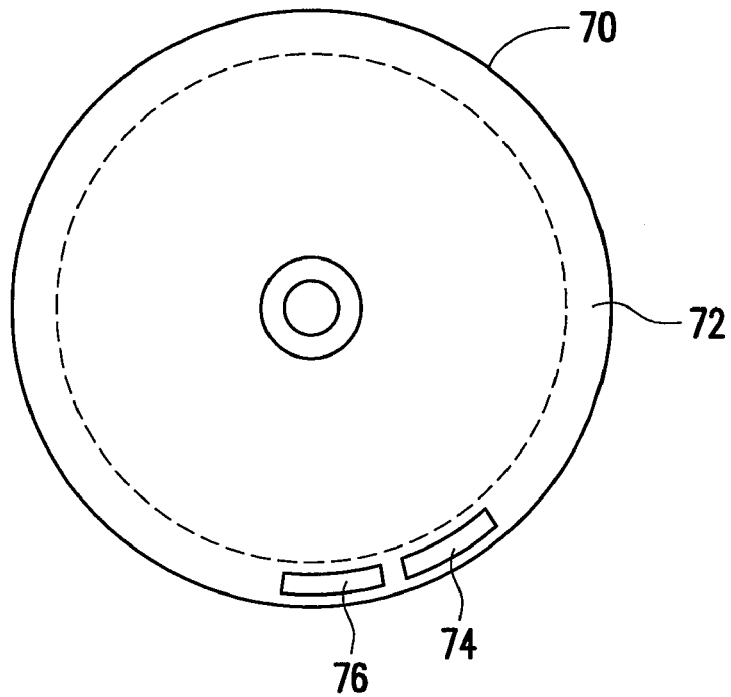

FIGS. 7A and 7B illustrate a recording medium structure that possesses a portable recording medium damage prevention management and a method for displaying the same according to another embodiment of the present invention. FIGS. 7A and 7B are examples for an optical disc 70. As shown in FIG. 7A, the optical disc 70 comprises a non-recording area 72 outside the data storage area. The optical disc 70 comprises two off-line display units 74, 76 disposed at the non-recording area 72. The off-line display unit 74 is adapted for displaying the ECC error rate, i.e., the real defect rate, while the off-line display unit 76 is adapted for displaying the Endu value, i.e., the potential defect rate. In this way, the user is allowed to realize the defect condition of the optical disc 70 in real time, and thus whether to backup data or not can be determined.

In FIG. 7A, the two off-line display units 74, 76 are arranged along a radial direction of the optical disc. In FIG. 7B, the two off-line display units 74, 76 are arranged along a circumferential direction of the optical disc. The arrangement of the off-line display units 74 and 76 can be arbitrary, which is determined by the location and size of the non-recording area 72.

Further, the off-line display units 74, 76 can be photochromic devices. When a laser is used to record/write onto the optical disc, the off-line display units 74, 76 can be correspondingly displayed based on the intensity of the laser beam. In addition, similar to the aforementioned embodiments, the off-line display units 74, 76 can also be displayed with strip patterns (single color, or different colors), or with numerals, etc.

The foregoing off-line display units can be a solar cell display device, an electrochromic material display device, a photochromic material display device, etc. The electrochromic material display device enables a display unit to display through electricity, and is applicable for recording medium, such as memory, hard disc, etc. The photochromic material display device enables a display unit to display with light energy (such as laser), and is applicable for recording medium such as optical disc, etc.

Above discussion generally describes the structure of data blocks in a flash memory. The storage areas are arranged according to the above discussion and in further facilitation with the Endu value which indicates the potential defect rate, and the importance of the files/data. In addition, displaying the ECC error rate and the Endu value on the recording medium have also been described above.

The structure of data blocks of the flash memory is described as above, and the storage area in the flash memory is allocated according to the endurance values Endu and the importance of the data/files. In addition, in the present embodiment, based on another characteristic, namely, the data movability, of flash memory, the data/files stored in the flash memory can be appropriately moved according to the changes of defective degree of the storage blocks. Thus, important data/files can be always stored in storage areas with higher reliability, so as to prevent the data/files from being lost or damaged. This process will be described below.

Figure 8:
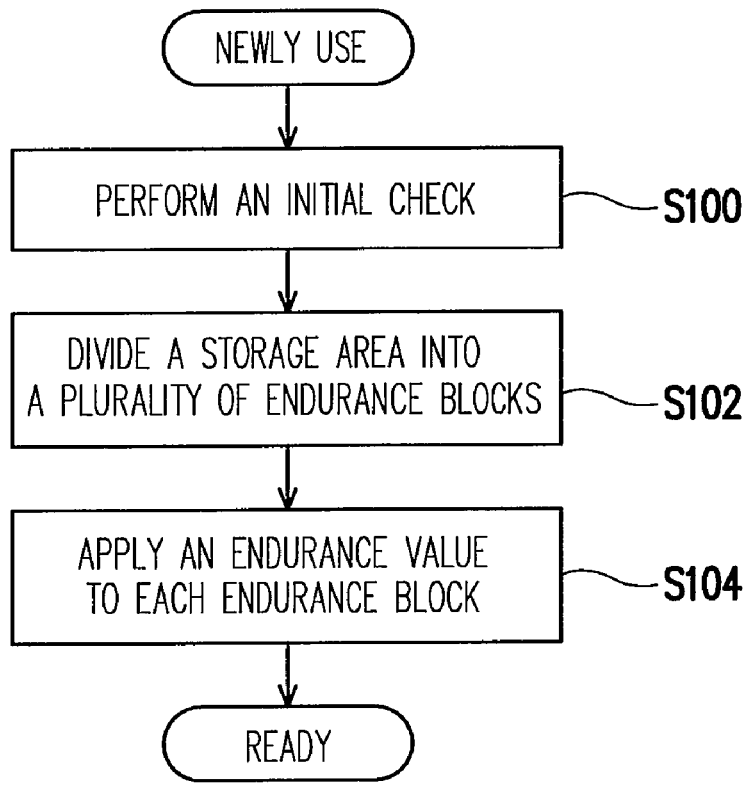
FIG. 8 is a flowchart of a defect management method according to one embodiment of the present invention.

FIG. 8 is a flowchart of a defect management method according to an embodiment of the present invention. The process shown in FIG. 8 is an initial status for use of a memory. First, in step S100, an initial check is performed. The initial check is a complete check to a storage area in the flash memory for determining whether data blocks have problem or defect. Then, in step S102, the storage area is divided, namely, logic storage areas in the storage area are addressed and allocated as shown in FIG. 3. Next, in step S104, the initial endurance blocks are assigned, for example, the areas 1~4 corresponding to endurance values 0~3 as shown in FIG. 3. Because the data blocks of the memory have not been used yet, the endurance blocks can be simply and linearly assigned according to space requirement.

Thereafter, the endurance value Endu of each endurance block is recalculated based on the erase/write and the read operations every time. Then, the data is moved among different endurance blocks according to the recalculated endurance values Endu. The calculation of the endurance values Endu will be described in detail as follows.

Figure 9:
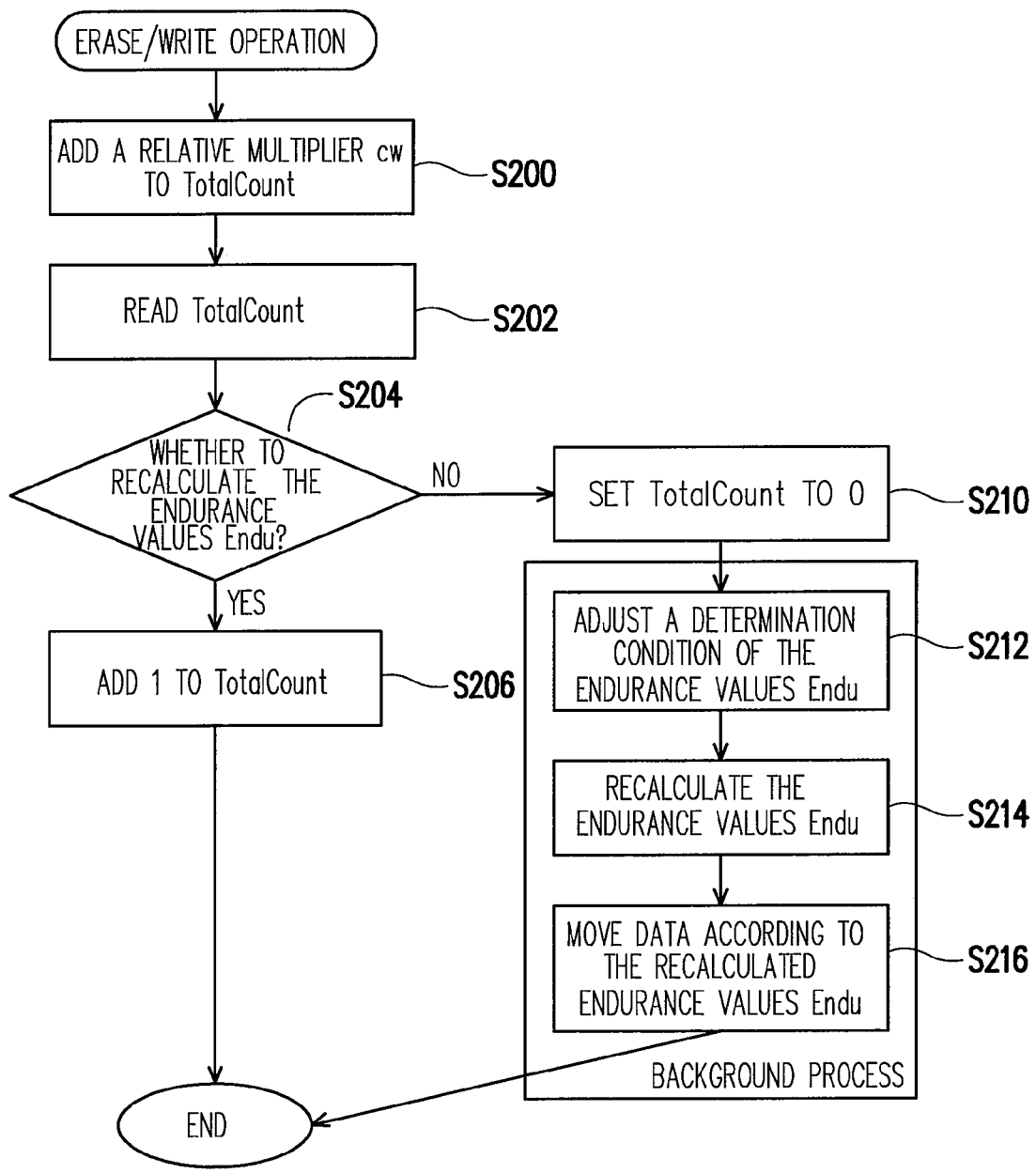
FIG. 9 is a flowchart of a data erase/write operation according to one embodiment of the present invention.

FIG. 9 schematically shows a flowchart of an erase/write operation according to one embodiment of the present invention. First, in step S200, a relative multiplier cw is added to an erase/write total count TotalCount, namely, TotalCount=TotalCount+cw. The erase/write total count TotalCount is recorded, namely, the total number of operations is calculated, while performing an erase/write operation or a read operation to the flash memory. Since the flash memory has a limited life cycle, the degree to be damaged (endurance) of the current recording block can be determined according to the times of operations. In addition, since there is a ration between the damages caused by the erase/write operation and the read operation to the memory, a reference value relative to the reading operation (i.e., the above relative multiplier cw) has to be added while calculating the total number of erase/write operations, so as to make the determination criterion more accurate. The relative multiplier cw added to the erase/write total count TotalCount at every erase/write operation is determined according to a damage ratio of read and write operations. For example, if the life cycle of the erase/write operations of the flash memory is 100,000 times, and the life cycle of reading the flash memory is 100,000,000 times, then the relative multiplier is 1000. As a result, the relative multiplier 1000 is added to the erase/write total count TotalCount when the erase/write operation is performed every time.

Next, in step S202, the erase/write total count TotalCount obtained in step S200 is read. In step S204, whether the endurance values Endu is needed to be recalculated is determined according to the erase/write total count TotalCount read in step S202. Usually, the endurance values Endu in the endurance table are recalculated when the erase/write total count TotalCount reaches a predetermined value.

In step S204, if the erase/write total count TotalCount does not reach the predetermined value, namely, the endurance values Endu are not required to recalculate, the erase/write total count TotalCount is increased by 1 and the erase/write operation is terminated. Otherwise, when the endurance values Endu is needed to be recalculated, the erase/write total count TotalCount is set to 0 in step S210, and steps S212~S216 are executed to recalculate the endurance values Endu. Preferably, the process for recalculating the endurance values Endu is a background process or a process of lower priority.

In the process for recalculating the endurance values Endu, first, in step S210, the erase/write total count TotalCount is set to 0. Next, a determination condition of the endurance values Endu is adjusted. The degree to be damaged of the flash memory is changed along with the increases in erasing/writing cycles and reading cycles. Thus, while recalculating the endurance values Endu, the determination condition (as shown in FIG. 4) of the endurance values Endu has to be adjusted appropriately as in step S212. After that, the endurance values Endu are recalculated according to the new determination condition of the endurance values Endu. In other words, the endurance values Endu of areas 1~4 in FIG. 3 are recalculated. For example, the endurance value of area 1 is 3, the endurance value of area 2 is 1, the endurance value of area 3 is 2, and the endurance value of area 4 is 0. Finally, the data is moved to a storage area having a corresponding endurance value according to the recalculated endurance values Endu, and after that, the erase/write operation is terminated.

Figure 10:
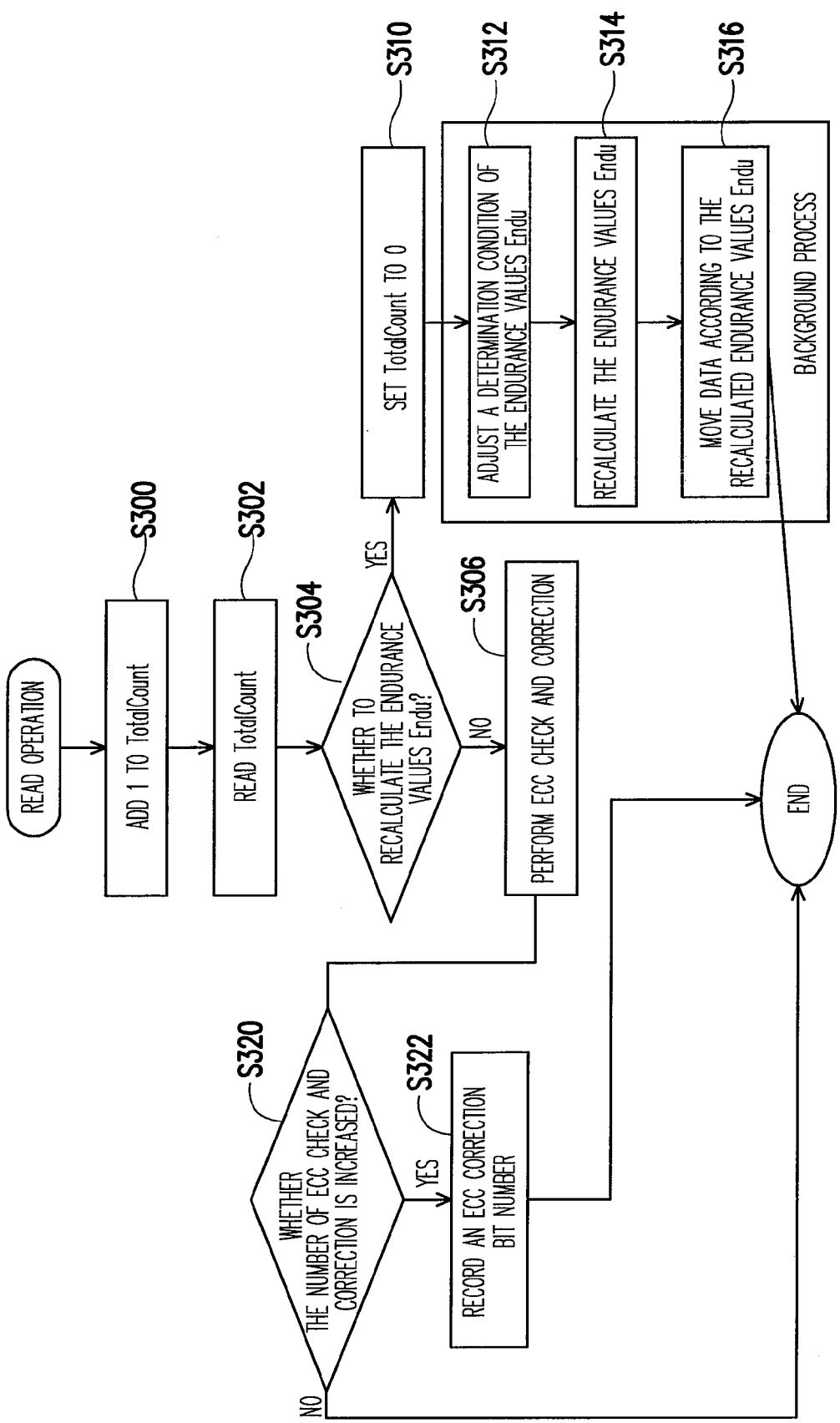
FIG. 10 is a flowchart of a data read operation according to an embodiment of the present invention.

FIG. 10 is a flowchart of a data read operation according to one embodiment of the present invention. A similar process as illustrated in FIG. 9 is performed while reading a flash memory. As shown in FIG. 10, first, in step S300, the read total count TotalCount is increased by 1. Next, in step S302, the read total count TotalCount obtained in step S300 is read. After that, in step S304, whether the endurance values Endu is needed to be recalculated is determined according to the read total count TotalCount read in step S302. Generally, the endurance values Endu in the endurance table are recalculated when the read total count TotalCount reaches a predetermined value.

If the read total count TotalCount does not reach the predetermined value, the endurance values Endu are not recalculated, and in step S304, an ECC check and correction is performed. While reading a memory, an ECC check and correction is usually performed to ensure that correct data is read. However, the number of ECC detections and corrections performed to a data block is also limited and accordingly also affects the endurance of the data block, thus, the number of ECC detections and corrections performed to the data block also has to be recorded (as shown in FIG. 4).

Accordingly, after step S304, whether the number of ECC check and correction is increased (step S320). If so, an ECC correction bit number is recorded in the endurance table as illustrated in FIG. 10 (step S322) and the read operation is terminated. Otherwise, if the number of the ECC detection and correction is not increased in step S320, the read operation is directly terminated.

Additionally, in step S304, if the read total count TotalCount reaches the predetermined value, which means the endurance values Endu is needed to be recalculated, then in step S310, the read total count TotalCount is set to 0, and steps S312~S316 are executed to recalculate the endurance values Endu. Preferably, the process for recalculating the endurance values Endu is a background process or a process of lower priority.

The process for recalculating the endurance values Endu is similar to that illustrated in FIG. 9. First, in step S310, the read total count TotalCount is set to 0, and then a determination condition of the endurance values Endu is adjusted. The determination condition of the endurance values Endu is needed to be adjusted appropriately as in step S312 while recalculating the endurance values Endu.

After that, the endurance values Endu are recalculated according to the adjusted determination condition. In other words, the endurance values of areas 1~4 in FIG. 3 are recalculated. Finally, the data is moved to a storage area having a corresponding endurance value according to the recalculated endurance values Endu, and after that, the read operation is terminated.

In addition, the ECC detection and correction in step S304 can be performed before or after determining whether the endurance values Endu is needed to be recalculated. If a new ECC correction is produced, the new ECC correction is recorded into the endurance table.

As described above, the categorization of data/files according to their importance can be achieved through foregoing initial process, erase/write operation, and read operation for calculating the endurance values Endu. In addition, various values in foregoing procedures can be adjusted in different application. For example, if a data block is left idle for a long time, the total count TotalCount can be reset every 1000 times, and the relative multiplier cw can be set to 10. In addition, these values may also be determined according to the frequency of data access.

Figure 11:
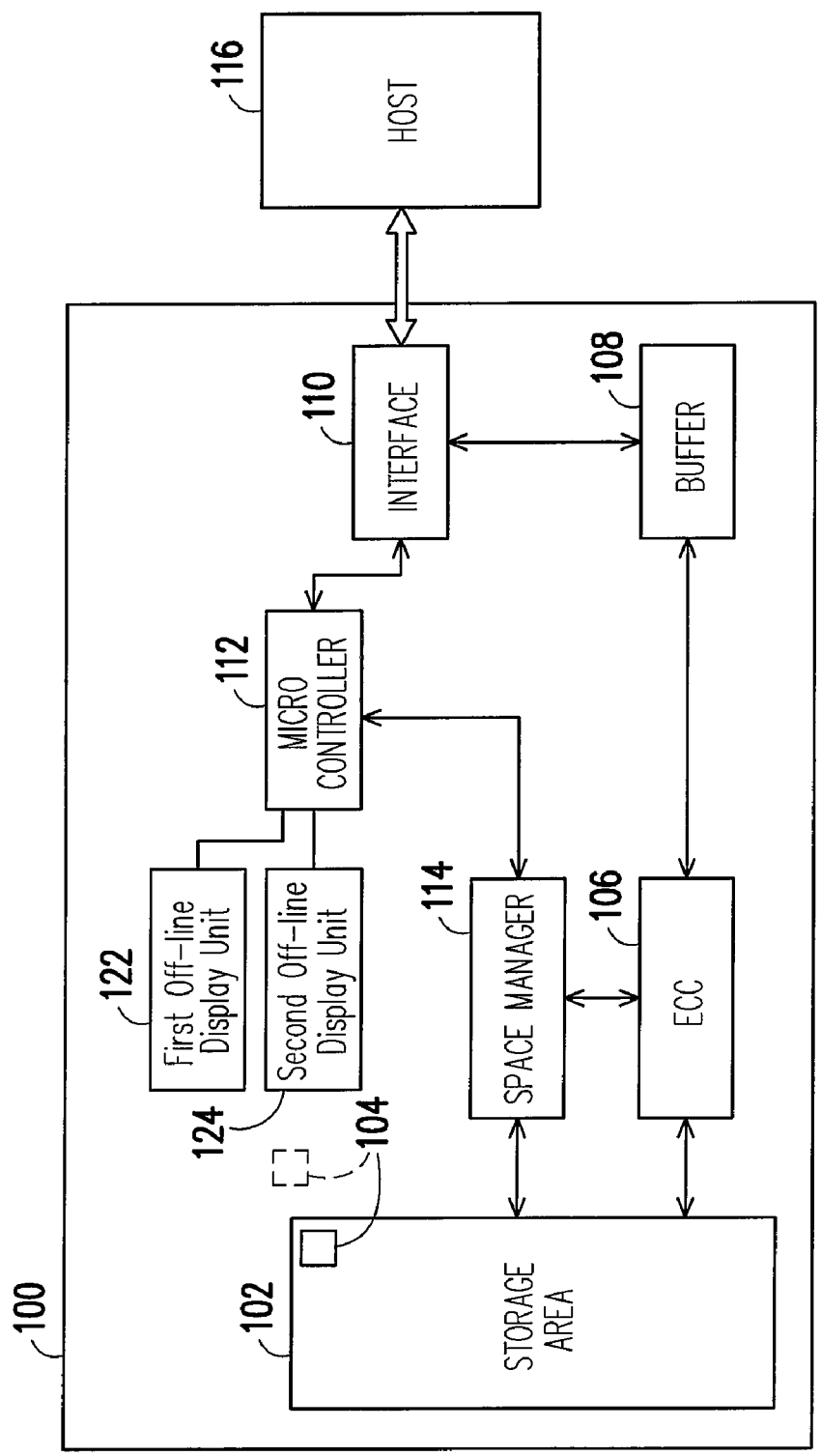
FIG. 11 illustrates the hardware architecture of a defect management system according to one embodiment of the present invention.

A hardware architecture for implementing foregoing method will be described as follows. FIG. 11 illustrates the hardware architecture of a defect management system according to one embodiment of the present invention. Referring to FIG. 11, the storage medium (a flash memory in the present embodiment) 100 includes a storage area 102, an ECC unit 106, a space manager 114, a micro controller 112, an interface 110, a buffer 108, and an endurance table 104.

The storage area 102 is mainly a physical storage area. The ECC unit 106 performs an ECC check and correction process to data to be written into or read from the storage area. The space manager 114 performs address management, allocation and configuration for the storage area. The micro controller 112 controls the entire flash memory 100. The flash memory 100 can communicate with a host (for example, a computer) 116 through the interface 110. The data to be read from or written into the storage area is stored in a register first, and then transmitted between the host 116 and the flash memory 100 through the interface 110. The endurance table 104 stores data as illustrated in FIG. 4, and can be stored in or out of the storage area 102.

The micro controller 112 executes the processes illustrated in FIGS. 8~10 in order to control the space manager 114. Accordingly, the endurance table as illustrated in FIG. 4 is established, and records the corresponding relationship between endurance blocks, writing cycles, ECC correction bit numbers, and endurance values. The micro controller 112 stores important data/files into data blocks with higher endurance values according to the importance of the data/files.

Moreover, the endurances of the data blocks can be recalculated at different stages while performing an erase/write operation or a read operation to the flash memory shown in FIGS. 8-10. After that, the data is moved appropriately according to the recalculated endurance values.

In addition, the hardware architecture in FIG. 11 can further comprises a first off-line display unit 120, and a second off-line display unit 122. The first off-line display unit 120 and the second off-line display unit 122 are respectively adapted for displaying the real defect rate, and the potential defect rate as shown in FIGS. 5A, 5B through 7A, and 7B.

According to the functions of the blocks illustrated in FIG. 11, the ECC error rate and the Endu values of the endurance block of the recording medium recorded in the recording medium can be transmitted to the first off-line display unit 120 and the second off-lien display unit 122 respectively under the control of the micro processor 112. In this way, the real defect rate and the potential defect rate can be provided to the user for reference.

Moreover, the first off-line display unit 120 and the second off-line display unit 122 are capable of displaying even though the recording medium is detached from the host, so that it is more convenient to the user to realize the real-time defect situation of the recording medium, and thus effectively managing the recording medium.

In summary, taking advantages of the foregoing method and system, the data can be adaptively moved according to the importance thereof and the defect rates of the storage blocks. In this way, the defect rate of the recording medium can be managed effectively. The user can realize the defect situation of the recording medium in real time by the off-line display units.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A recording medium structure capable of displaying a defect rate, the recording medium structure comprising:
    at least one use data area haying a plurality of endurance blocks, wherein each of the endurance blocks having an endurance value:
    a housing;
    a first off-line display unit, arranged on the housing for displaying a real defect rate of the recording medium structure, wherein the real defect rate is calculated according to error correction code (ECC) bit numbers of the endurance blocks; and
    a second off-line display unit, arranged on the housing for displaying a potential defect rate of the recording medium structure, wherein the potential defect rate is calculated according to the endurance values, the endurance values are calculated according to counting numbers and the ECC bit numbers of the endurance blocks, and the counting numbers are the numbers of erasing/writing cycles of the endurance blocks.

2. The recording medium structure of claim 1, wherein the recording medium structure is a memory or a hard disc.

3. The recording medium structure of claim 2, wherein the first off-line display unit and the second off-line display unit are a solar cell display device, or an electrochromic material display device.

4. The recording medium structure of claim 1, wherein the recording medium structure is an optical disc recording medium.

5. The recording medium structure of claim 4, wherein the first off-line display unit and the second off-line display unit are a photochromic material display device.

6. The recording medium structure of claim 4, wherein the first off-line display unit and the second off-line display unit are arranged on non-recording area of the optical disc recording medium.

7. The recording medium structure of claim 1, wherein the first off-line display unit and the second off-line display unit display respectively the real defect rate and the potential defect rate with a strip pattern or numerals.

8. The recording medium structure of claim 1, wherein calculating the endurance values further comprises:
performing an initial check to the recording medium structure, and dividing the recording medium structure into a plurality of areas, so as to obtain the at least one use data area having the endurance blocks;
applying an initial endurance value to each of the endurance blocks in the use data area;
establishing an endurance table in the recording, medium structure, wherein the endurance table records the endurance blocks and the initial endurance values;
performing an erase/write operation to the recording medium structure according to the endurance table, wherein the endurance values of the endurance blocks are recalculated and the endurance table is updated accordingly when the recording medium structure has been erased/written for predetermined erase/write times; and
performing a read operation to the recording medium structure, wherein the endurance values of the endurance blocks are recalculated and the endurance table is updated accordingly when the recording medium structure has been read for predetermined read times.

9. The recording medium structure of claim 1, wherein each of the endurance blocks further comprises a plurality of data blocks, and each of the data blocks comprises an ECC data unit.

10. The recording medium structure of claim 1, wherein the endurance table comprises the endurance blocks, the writing cycles, a sum of the ECC error correction bytes, and the endurance values.

11. A recording medium structure capable of displaying a defect rate, the recording medium structure comprising:
a housing;
a plurality of replaceable memory blocks, arranged in the housing, wherein each of the replaceable memory blocks has at least one use data area having a plurality of endurance blocks, and each of the endurance blocks having an endurance value;
a plurality of first off-line display unit, for displaying a real defect rate of each of the replaceable memory blocks, wherein each of the real defect rates is calculated according to error correction code (ECC) bit numbers of the endurance blocks belonging to each of the replacement memory blocks; and
a plurality of second off-line display unit, for displaying a potential defect rate of each of the replaceable memory blocks, wherein each of the potential defect rates is calculated according to the endurance values of the endurance blocks belonging to each of the replacement memory blocks, the endurance values are calculated according to counting numbers and the ECC bit numbers of the endurance blocks, and the counting numbers are the numbers of erasing/writing cycles of the endurance blocks.

12. The recording medium structure of claim 11, wherein the recording medium structure is a memory or a hard disc.

13. The recording medium structure of claim 12, wherein the first off-line display unit and the second off-line display unit are a solar cell display device, or an electrochromic material display device.

14. The recording medium structure of claim 11, wherein the first off-line display units and the second off-line display units are respectively arranged on corresponding replaceable memory blocks.

15. The recording medium structure of claim 11, wherein the first off-line display units are integrated as a single display unit disposed on the housing, and the second off-line display units are integrated as a single display unit disposed on the housing.

16. The recording medium structure of claim 11, wherein the first off-line display units and the second off-line display units display respectively the real defect rate and the potential defect rate with a strip pattern or numerals.

17. The recording medium structure of claim 11, wherein calculating the endurance values further comprises:
performing an initial check to the recording medium structure, and dividing the recording medium structure into a plurality of areas, so as to obtain the at least one use data area having the endurance blocks;
applying an initial endurance value to each of the endurance blocks in the use data area;
establishing an endurance table in the recording medium structure, wherein the endurance table records the endurance blocks and the initial endurance values;
performing an erase/write operation to the recording medium structure according to the endurance table, wherein the endurance values of the endurance blocks are recalculated and the endurance table is updated accordingly when the recording medium structure has been erased/written for predetermined erase/write times; and
performing a read operation to the recording medium structure, wherein the endurance values of the endurance blocks are recalculated and the endurance table is updated accordingly when the recording medium structure has been read for predetermined read times.

18. The recording medium structure of claim 11, wherein each of the endurance blocks comprises a plurality of data blocks, and each of the data blocks comprising an ECC data unit.

19. The recording medium structure of claim 11, wherein the endurance table comprises the endurance blocks, the writing cycles, a sum of the ECC error correction bytes, and the endurance values.

20. A recording medium structure capable of displaying a defect rate, comprising:
a storage area, comprising at least a plurality of endurance blocks;
a space manager, coupled to the storage area for managing the storage area;
an ECC unit, coupled to the storage area and the space manager, the ECC unit performing an ECC detection and correction when an erase/write operation or a read operation is performed to the storage area;
an endurance table, recording an endurance value of each of the endurance blocks;
a first off-line display unit, for displaying a real defect rate of the recording medium structure, wherein the real defect rate is calculated according to error correction code (ECC) bit numbers of the endurance blocks;
a second off-line display unit, for displaying a potential defect rate of the recording medium structure, wherein the potential defect rate is calculated according to the endurance values, the endurance values are calculated according to counting numbers and the ECC bit numbers of the endurance blocks, and the counting numbers are the numbers of erasing/writing cycles of the endurance blocks; and a microcontroller, coupled to the space manager, the first off-line display unit and the second off-line display unit, for controlling the first and the second off-line display units according to a processed result of the ECC unit and the endurance values recorded in the endurance table.

21. The recording medium structure of claim 20, wherein the endurance table comprises the endurance blocks, the writing cycles, a sum of the ECC error correction bytes, and the endurance values.

22. The recording medium structure of claim 20, wherein the recording medium structure is a memory or a hard disc, and the first off-line display unit and the second off-line display unit are a solar cell display component, an electrochromic material display component, or a photochromic material display component.

23. The recording medium structure of to claim 22, wherein the first off-line display unit and the second off-line display unit display respectively the real defect rate and the potential defect rate with a strip pattern or numerals.

* * * * *